2,900,365

ORGANOPHOSPHORUS POLYMERS

Alfred Coles Haven, Jr., Hancocks Bridge, N.J., assignor to E. I. du Pont de Nemours and Company, Wilmington, Del., a corporation of Delaware No Drawing. Application October 25, 1955
Serial No. 542,763

4 Claims. (Cl. 260—47)

This invention relates to a new class of organophosphorus polymers and more particularly to organophosphorus polymers made from dialkyl phosphonates.

This invention has as an object to provide a new class of organophosphorus polymers. A further object is to provide organophosphorus polymers suitable as antioxidants for synthetic fibers. Other objects will appear hereinafter.

These and other objects are accomplished by the following invention of polymeric organophosphorus compounds containing in the polymer chain the recurring structural unit

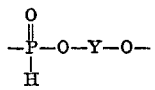

wherein X is the nucleus of an aromatic diol. These polymers are all of reasonably high molecular weight in that there are at least five of the above-identified structural units present in the polymer chain.

In general, the polymers of the present invention are prepared by heating approximately equivalent quantities of a dialkyl phosphonate and the aromatic diol to a temperature above the boiling point of the alcohol from which the phosphonate is derived for a period of about from one-half to four hours, or until no more alcohol distills from the reaction mixture. Temperatures in the range of from about 150 to 275° C. are usually sufficient to carry out the reaction. When the distillation of alcohol from the reaction mixture ceases, the pressure within the reaction apparatus is reduced to about 1 mm. Hg in order to remove any low molecular weight product, by-products and unreacted starting materials. Generally, these materials which are removed from the product are referred to as "light ends." The residue is then allowed to cool and the desired organophosphorus polymer is obtained.

The following examples will better illustrate the nature of the present invention; however, the invention is not intended to be limited to these examples.

Example I

A. A mixture of 11.0 g. of dimethyl phosphonate and 22.8 g. of 2,2-bis(4-hydroxyphenyl)propane was heated under a short distillation column. The temperature was raised slowly over a period of four hours from 200° to 275° C. during which period methanol distilled from the reaction mixture. The pressure within the apparatus was then reduced to 1 mm. Hg and the "light ends" were removed under these conditions over a period of one-half hour. The residue was cooled to obtain a faintly-colored, brittle glass, insoluble in water, soluble in alcohol.

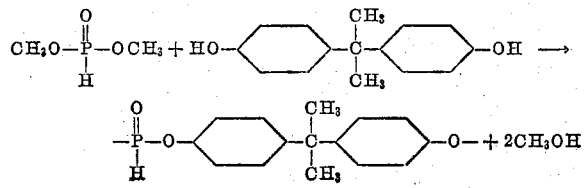

B. Following the procedure of Example 1A, resorcinol was reacted with dimethyl phosphonate and hydroquinone was reacted with dimethyl phosphonate. The resulting polymers were brittle glasses, soluble in alcohol and dimethylformamide, but insoluble in water.

Example II 11 g. of dimethyl phosphonate and 11 g. of resorcinal were heated under a short distilling column and methanol distilled out as the temperature was raised from 190° to 275° C. The pot contents were held at 275° C. for one hour and then heated further at 300° C. at 2 mm. for one hour. A small amount of material distilled over during the second hour. The residue was a red glass from which fibers could be manually spun. The cooled product is soluble in alcohol and insoluble in water and hydrolyzes slowly in water since it dissolves on prolonged standing.

Example III 11 g. of hydroquinone and 11 g. of dimethyl phosphonate were heated to 250° C. and held at that temperature for one hour under reduced pressure. At the end of this treatment, fibers could be drawn from the hot melt. The cold melt was a hard, lightly colored glass which was slowly soluble in water, presumably with hydrolysis.

While the invention has been illustrated by use of only several representative active hydrogen compounds, it is to be understood that other diols, such as bis(4-hydroxyphenyl)methane; 1,1-bis(4-hydroxyphenol)ethane; and the 1,4-; 1,5-; 2,5-; 2,6-; 2,7-dihydroxynaphthalenes are operable.

The polymeric organophosphorus compounds of the present invention are usually colorless to amber-colored with a syrupy to glass-like consistency, with some of them being red in color. Some are water soluble and all of them are soluble in the lower alcohols, acetone and N-dialkyl amides. The polymers have shown utility in protecting synthetic fibers, more particularly nylon, against oxidative degradation by treating the nylon with an ethanol solution containing the polymers.

As many apparently widely different embodiments of this invention may be made without departing from the spirit and scope thereof, it is to be understood that this invention is not limited to the specific embodiments thereof except as defined in the appended claims.

This application is a continuation-in-part of copending application Serial No. 441,172, filed July 2, 1954, now abandoned.

I claim:

1. A linear organophosphorus polymer having, as the polymer chain, a recurring structural unit taken from the group consisting of

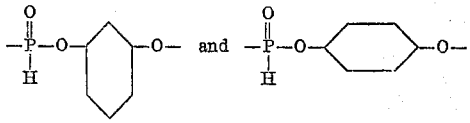

2. A linear organophosphorus polymer having, as the polymer chain, the recurring structural unit

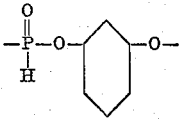

3. A linear organophosphorus polymer having, as the polymer chain, the recurring structural unit

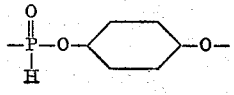

4. A process for the preparation of a linear organophosphorus polymer wherein approximately equimolar quantities of dimethyl phosphonate having the formula

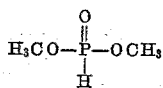

is reacted with an aromatic diol taken from the group consisting of resorcinal and hydroquinone at a temperature of from 150° C. to 300° C. for a period of about from one-half to four hours and separating the polymer thus produced.

References Cited in the file of this patent
UNITED STATES PATENTS
2,743,258    Coover _____ Apr. 24, 1956

OTHER REFERENCES
Arbuzov et al.: Compt. rend. acad. sci. U.R.S.S. 54, pp. 599–601 (1946).